(12) United States Patent
Lewis et al.

(10) Patent No.: US 9,391,706 B2
(45) Date of Patent: Jul. 12, 2016

(54) TUNING DEVICE FOR PLUGGABLE OPTICAL TRANSCEIVERS

(71) Applicant: Champion Optical Network Engineering, LLC, Beachwood, OH (US)

(72) Inventors: Keith Lewis, Brecksville, OH (US); Paul A. Hospodar, Strongsville, OH (US); Charles S. Weinberger, Pepper Pike, OH (US)

(73) Assignee: CHAMPION OPTICAL NETWORK ENGINEERING, LLC, Beachwood, OH (US)

( * ) Notice: Subject to any disclaimer, the term of this patent is extended or adjusted under 35 U.S.C. 154(b) by 11 days.

(21) Appl. No.: 14/390,846

(22) PCT Filed: Apr. 5, 2013

(86) PCT No.: PCT/US2013/035423
§ 371 (c)(1),
(2) Date: Oct. 6, 2014

(87) PCT Pub. No.: WO2013/152278
PCT Pub. Date: Oct. 10, 2013

(65) Prior Publication Data
US 2015/0086214 A1    Mar. 26, 2015

Related U.S. Application Data

(60) Provisional application No. 61/620,706, filed on Apr. 5, 2012, provisional application No. 61/664,884, filed on Jun. 27, 2012.

(51) Int. Cl.
*H04B 10/00*    (2013.01)
*H04B 10/40*    (2013.01)
*H04J 14/02*    (2006.01)

(52) U.S. Cl.
CPC *H04B 10/40* (2013.01); *H04J 14/02* (2013.01)

(58) Field of Classification Search
CPC ................................. H04B 10/40; H04B 10/43
See application file for complete search history.

(56) References Cited

U.S. PATENT DOCUMENTS

| 8,165,471 | B2 | 4/2012 | Theodoras, II et al. |
| 8,457,165 | B2 * | 6/2013 | Liu ..................... H01S 5/06256 372/102 |
| 2007/0153823 | A1 | 7/2007 | Wojtowicz |

(Continued)

FOREIGN PATENT DOCUMENTS

EP    1453346 B1    2/2003

OTHER PUBLICATIONS

PCT International Search Report; International Application No. PCT/US2013/035423; Applicant: Champion Optical Network Engineering, LLC; International Filing Date: Apr. 5, 2013; Date of Actual Completion of International Search: Jul. 26, 2013; Date of Mailing of International Search Report: Jul. 26, 2013.

*Primary Examiner* — Dzung Tran
(74) *Attorney, Agent, or Firm* — Pearne & Gordon LLP

(57) ABSTRACT

A tuning device for a pluggable XFP and SFP+ and DWDM transceiver devices. Also provided are applications for CWDM XFP, and SFP+ and future form factors as well as DWDM and CWDM SFP. This tuning device is for use with tunable DWDM and CWDM transceivers, and provides the ability to lock the tune of the transceiver to prevent a host device from automatically retuning the transceiver.

21 Claims, 7 Drawing Sheets

(56) References Cited

U.S. PATENT DOCUMENTS

| | | |
|---|---|---|
| 2009/0232505 A1 | 9/2009 | Degan et al. |
| 2009/0232516 A1 | 9/2009 | Hirano |
| 2009/0304384 A1 | 12/2009 | Li |
| 2011/0191632 A1* | 8/2011 | Miller .................. G06F 11/28 714/27 |
| 2011/0229129 A1* | 9/2011 | Hu ........................ H04B 10/40 398/34 |
| 2011/0262142 A1* | 10/2011 | Archambault .......... H04J 14/02 398/83 |

* cited by examiner

TUNING DEVICE FOR PLUGGABLE OPTICAL TRANSCEIVERS

CROSS-REFERENCES TO RELATED APPLICATIONS

This application is a national stage application of PCT application serial number PCT/US2013/035423 filed on Apr. 5, 2013, and incorporated herein by reference, which claims the benefit of U.S. provisional application Ser. No. 61/620,706, filed on Apr. 5, 2012, incorporated herein by reference and which also claims the benefit of U.S. provisional application Ser. No. 61/664,884, filed on Jun. 27, 2012, and incorporated herein by reference.

BACKGROUND

Dense Wavelength Division Multiplexing (DWDM), and Coarse Wavelength Division Multiplexing (CWDM) are techniques for increasing the bandwidth of optical network communications. CWDM allows for eighteen different data signals to be transmitted simultaneously over a pair of fibers. DWDM allows many (e.g., dozens) of different data signals to be transmitted simultaneously over a pair of fibers. To keep the signals distinct, CWDM/DWDM manipulates wavelengths of light to keep each signal within its own narrow band. Depending upon the application, CWDM/DWDM is a generally more cost-effective alternative to Time Division Multiplexing (TDM).

CWDM and DWDM Pluggable Transceivers are typically provided at relatively higher cost, and longer lead time product. This is due to the nature of the product itself: typical CWDM hot-swappable, pluggable transceivers are offered in a total of 18 different standardized channels used for various applications. Similarly, 'fixed channel' DWDM hot-swappable, pluggable transceivers are offered in no less than 40 different channels (e.g., as specified by the 100 GHz channel spacing standardized by the ITU), and different organizations and different switch and router manufacturers have a variety of needs for groups of these channels. Because of the continued need for higher bandwidth connectivity for the generalized 'service provider' market, coupled with a general scarcity of fiber availability (or the need for conservation of fiber plant due to new mandates by the construction arms of these providers), the market finds itself in a position where multiplexing solutions (CWDM and DWDM) are an attractive methodology for maximizing the fiber infrastructure with minimal operational impact, requiring only incremental capital expenditure.

The situation—as it stands today—is summarized as follows: different end users have different channel requirements, planning schema, and rollout procedures that do not synchronize with the typical lead times for these pluggable optics. That lead time is typically 8 to 12 weeks, if not longer. This lead time can often push out revenue for the end user (service provider) or cause loss of contractual business due to inability to bring up services in a timely—or more competitive—manner.

Tunable transceivers have existed in systems for some time. However, they were proprietary, card- or blade-based solutions that were NOT hot-swappable or hot-pluggable, were not industry standard (each vendor had their own mechanism for tuning of the channel via their own software) and were not cost effective.

The advent of the pluggable version of a tunable DWDM transceiver, in the standard XFP form factor, meant that the proprietary aspects of the blade-based solutions were removed. The benefits of an MSA-compliant pluggable optical transceiver would mean that electrical, optical, and mechanical specifications would be standardized, and that any manufacturers of switches or routers that utilize these form factors for their 10 GBase (10 Gigabit Ethernet), 10G Fibre Channel, or SONET OC-192 ports would now have access to a tunable solution.

However, these platforms would need modified operating system software which would have the capacity to access the EEPROM of the XFP transceiver via the I2C communication bus and set the channel or wavelength (these terms are used interchangeably, though they are not synonymous in the most literal sense). The platforms that have this capability are typically higher-end, higher density core or access devices, and therefore the 'edge' or 'customer premise' level-devices are still left without a solution.

SUMMARY

Provided are example embodiments of the device, including, but not limited to, a tuning device or appliance for a pluggable XFP and SFP+, when available, DWDM transceiver device. This disclosure also considers application for CWDM XFP, and SFP+ and future form factors as well as DWDM and CWDM SFP, when applicable. This tuning device is for use with tunable Dense Wavelength-Division Multiplexing (DWDM), and for tunable CWDM transceivers.

Provided is an appliance that can be used to set and lock the ITU channel of a tunable DWDM and CWDM optical transceiver (currently SFP+ or XFP form factors) without the use of a ROADM (Reconfigurable Optical Add Drop Multiplexer), switches, routers, or other optical transport device. The example appliance will be a standalone device that is battery powered (e.g., 3.3v) and will also include a wall power adapter. A computer connection is not necessarily required for tuning a transceiver with this appliance; however, an interface, such as a USB connection, will be available for firmware upgrades as well as any future software that will enable tuning via a PC connection.

For simplicity, connecting the appliance to a PC is not required for tuning the transceiver. The device will include an LCD screen with input buttons that will allow the user to select and lock, "tune," the ITU channel once the transceiver has been inserted into the appliance. The LCD will also report out the existing status of the transceiver as well as the current channel selected. The appliance will also enable retuning of a previously tuned optic.

The product is designed to "tune" or channel/wavelength select a tunable DWDM or CWDM optical transceiver without using a switch, router or similar equipment that is a part of a network. Tunable optics are designed for use in networks where the switch or router software enables the network operator to remotely change the ITU channel of the tunable XFP or SFP+(or additional form factors when available) integrated into the switch or router. The product concept is to use the tunable optic as a replacement for a fixed optic in situations where availability, either due to long lead times or lack of inventory for a particular DWDM (or CWDM) wavelength, means a delay in the turn up of a new circuit that requires the "new" channel/wavelength selected. The desire is to provide the tunable XFPs and SFP+ (and other future available transceivers) form factors when they are generally available along with this appliance that will allow customers to turn up channels on their networks instantly. Tunable DWDM optics are envisioned to serve as spare units versus a customer having to spare every fixed wavelength channel (40 such channels in the C-band alone). (tunable CWDM optics are envisioned to perform the same potential function as spare units versus having to spare each of the eighteen different CWDM channels). Fixed wavelength optics are lower cost optical transceivers, and are traditionally deployed in optical networks that require little channel change or addition.

Provided are a plurality of example embodiments, including, but not limited to, an apparatus for tuning a pluggable transceiver device comprising: a power supply; a controller; a user interface connected to the controller configured to accept user inputs; a display connected to the controller configured to display tuning information to the user; and a transceiver interface configured to receive the transceiver device. The controller is configured to tune the optical transceiver device received by the interface according to the user inputs, such that the transceiver uses the tune when removed from the apparatus and inserted into a separate host device for using the optical transceiver device.

Also provided is an apparatus for tuning a pluggable transceiver device comprising: a power supply; a controller; a user interface connected to the controller configured to accept user inputs; a display connected to the controller configured to display tuning information to the user; and a transceiver interface configured to receive the transceiver device. The controller is configured to tune the optical transceiver device received by the interface according to the user inputs, such that the transceiver uses the tune when removed from the apparatus and inserted into a separate host device for using the optical transceiver device and such that the transceiver retains the tune when inserted into the host device by locking the transceiver to prevent the host from retuning the transceiver.

Further provided is an apparatus for tuning a pluggable transceiver device comprising: a power supply; a controller; a user interface connected to the controller configured to a display connected to the controller configured to display tuning information to the user; and a transceiver interface configured to receive the transceiver device. The controller is configured to tune the optical transceiver device received by the interface according to the user inputs, such that the transceiver uses the tune when removed from the apparatus and inserted into a separate host device for using the optical transceiver device and such that the transceiver retains the tune when inserted into the host device by locking the transceiver to prevent the host from retuning the transceiver. The apparatus does not operate as a host device for using the optical transceiver, and the apparatus does not communicate with any external device when tuning the optical transceiver.

Also provided is any of the above apparatuses where the transceiver device is a DWDM optical transceiver or a CWDM optical transceiver.

Further provided is a method of tuning a pluggable transceiver device using any of the apparatuses described above, the method comprising the steps of:
  inserting the transceiver device into the apparatus using the transceiver interface;
  accepting user inputs to the user interface for tuning the transceiver device;
  displaying information about the tuning on the display;
  tuning the transceiver device according to the user inputs resulting in a tuned transceiver device;
  removing the tuned transceiver device from the apparatus;
  inserting the tuned transceiver in a host device; and
  operating the host device using the tuned transceiver.

Also provided is method for tuning a pluggable transceiver device using a tuning apparatus, the method comprising the steps of:
  inserting the transceiver device into the tuning apparatus;
  accepting user inputs to the tuning apparatus for tuning the transceiver device;
  tuning the transceiver device according to the user inputs resulting in a tuned transceiver device;
  removing the tuned transceiver device from the apparatus;
  inserting the tuned transceiver into a host device; and
  operating the host device using the tuned transceiver.

Further provided is method for tuning a pluggable transceiver device using a tuning apparatus, the method comprising the steps of:
  inserting the transceiver device into the tuning apparatus;
  accepting user inputs to the tuning apparatus for tuning the transceiver device;
  tuning the transceiver device according to the user inputs resulting in a tuned transceiver device without the tuning apparatus communicating with any external devices;
  locking the transceiver to prevent a device using the tuned transceiver from retuning the transceiver;
  removing the tuned transceiver device from the apparatus.

Also provided are additional example embodiments, some, but not all of which, are described hereinbelow in more detail.

BRIEF DESCRIPTION OF THE DRAWINGS

The features and advantages of the examples described herein will become apparent to those skilled in the art to which this disclosure relates upon reading the following description, with reference to the accompanying drawings, in which.

DETAILED DESCRIPTION OF THE EXAMPLE EMBODIMENTS

Figure 1:
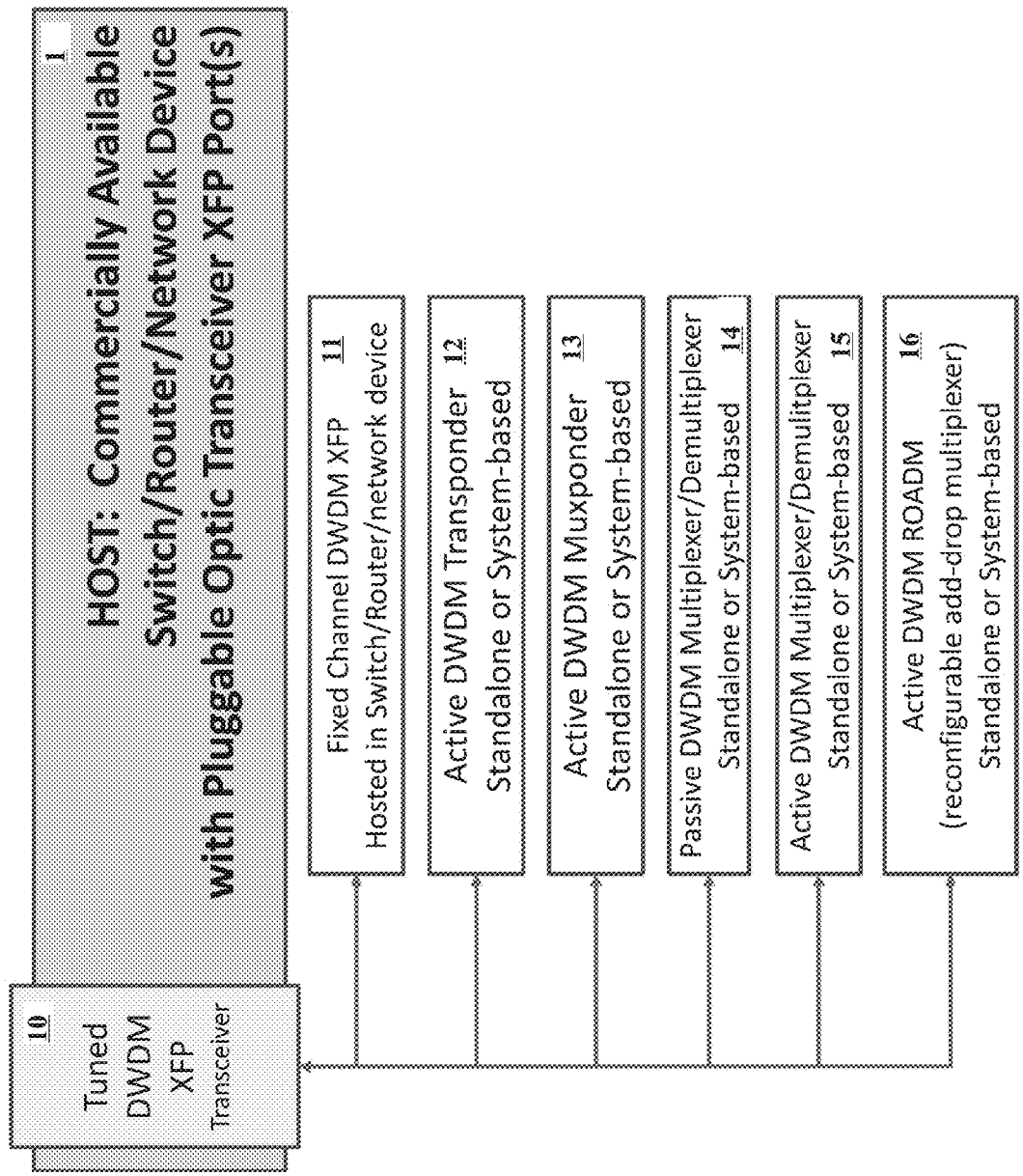
FIG. 1 shows example devices that the XFP pluggable DWDM transceiver device can be used to tune.

Provided is an example tuning device appliance for tuning a pluggable XFP DWDM transceiver device. The technology Category of the disclosed device is Optical Networking.

The new device is a transceiver tuning box (appliance) for use with tunable Dense Wavelength-Division Multiplexing (DWDM) transceivers. An appliance that can be used to set and lock the ITU channel of a tunable DWDM (or CWDM) optical transceiver (currently SFP+ or XFP form factors with others supported as they become available) without the use of a ROADM, switches, routers, or other optical transport devices. This appliance can be a standalone device that includes a wall power adapter with an optional external battery pack (e.g., 3.3v) and even a vehicle power adapter. Computer connection is not required for tuning a DWDM transceiver with this appliance; however, an interface, such as a USB connection, will be available for firmware upgrades as well as any future software that will enable tuning via a PC connection.

For simplicity, connecting the appliance to a PC is not required for tuning. The appliance box will include an LCD screen with input buttons (e.g., push buttons or a touch screen) that will allow the user to select and lock the ITU channel once the transceiver has been inserted into the appliance. The LCD will also report out the existing status of the transceiver as well as the current channel selected. The appliance will also enable retuning of a previously tuned optic.

Customer Benefit: Due to the long lead time of fixed channel tunable DWDM transceivers (industry average of 8 to 10 weeks), this concept will enable customers to turn up network links that require specific DWDM channel transceivers within days, as opposed to weeks, by enabling the ability to tune and lock the channel for "blank" transceivers. They would then, once the fixed channel optics are available, be able to replace the tuned optics with the fixed channel transceivers and reuse the previously tuned optics for future projects. Similar with respect to CWDM transceiver.

The example optical product described herein is a tuning device for tuning an XFP pluggable DWDM transceiver device, which would be able to be tuned to a desired wavelength and LOCKED at that channel, even with removal of power. This tuning would typically be performed in-house by production technicians, or in the field by the staging engineers or technicians at the service provider. The mechanism for tuning would be accomplished via the tuning appliance, which would allow for an operator to set (via an easy to use push-button interface) the channel and to lock and verify that the channel is set.

One problem that was first to be addressed in the development of this tuning device is that the optic device only retains the channel it is 'tuned' to when power is supplied to the device via the port it occupies. This problem would previously limit the usage of the XFP pluggable DWDM transceiver device to those platforms which have tuning software available. Other "ends" of the link must utilize a similar platform, or deploy fixed channel optics, which, as stated earlier, have the associated lead times which limit the flexibility and reactivity of the end user (the service provider).

Some of the example benefits to providing this unique tuning device are listed below:
1. Reduced sparing: Instead of a possibility of 40 unique channels being deployed and spares (typically 1 unit per wavelength) held 'on the shelf', a single unit could be spared and tuned as needed in the case of a field replacement.
2. Reduced or eliminated lead-time: As the limiting factor (laser availability for specific DWDM wavelengths) is now removed, the end user can either rely on the vendor to have an on-hand stock of 'tunable' optics which could be tuned and shipped the same day as a request is made, or the end user could hold stock of 'untuned' transceivers and have a technician utilize a purchased tuning appliance (as detailed) to perform the tuning as needed.
3. Increased Redeployment Capability: As circuits are modified or as equipment is redeployed/repurposed in a network, there are often differing channel plans utilized by the planning engineers. As a result, the channels which may be available in fixed channel transceivers could be useless if equipment is moved to other areas of the network. This would allow for retuning in the field of the devices, allowing them to be further utilized, eliminating the need for additional parts to be ordered.

FIG. 1 shows a diagram of various applications of the already tuned (using the process defined below) DWDM XFP Transceiver device 10 installed the host 1. The 'tuned' device can be used in any 'platform' (switch, router, etc.) that has ports for XFPs and adheres to industry standards. The tuned DWDM XFP Transceiver can connect to any of the listed devices directly, or in series (e.g., Active DWDM Multiplexer/Demultiplexer which is then connected to a DWDM Transponder). These devices include: Fixed Channel DWDM XFP Hosted in Switch/Router/network device 11; Active DWDM Transponder Standalone or System-based 12; Active DWDM Muxponder Standalone or System-based 13; Passive DWDM Multiplexer/Demultiplexer Standalone or System-based 14; Active DWDM Multiplexer/Demulitplexer Standalone or System-based 15; and/or Active DWDM ROADM (reconfigurable add-drop multiplexer) Standalone or System-based 16.

The 'programming device' appliance described herein, which tunes the DWDM XFP Transceiver device, in contrast, has no need for connections to the outside world—it's a stand-alone tool for tuning the DWDM XFP Transceiver. The 'tuned' XFP then can connect to all sort of devices in a network, but the first, direct connections would be it being plugged into an XFP port (it's the male, the port is the female of this connection). The tuned DWDM XFP Transceiver can connect to any of the devices shown in FIG. 1 directly, or in series (e.g., Active DWDM Multiplexer/Demultiplexer which is then connected to a DWDM Transponder).

Figure 2A:
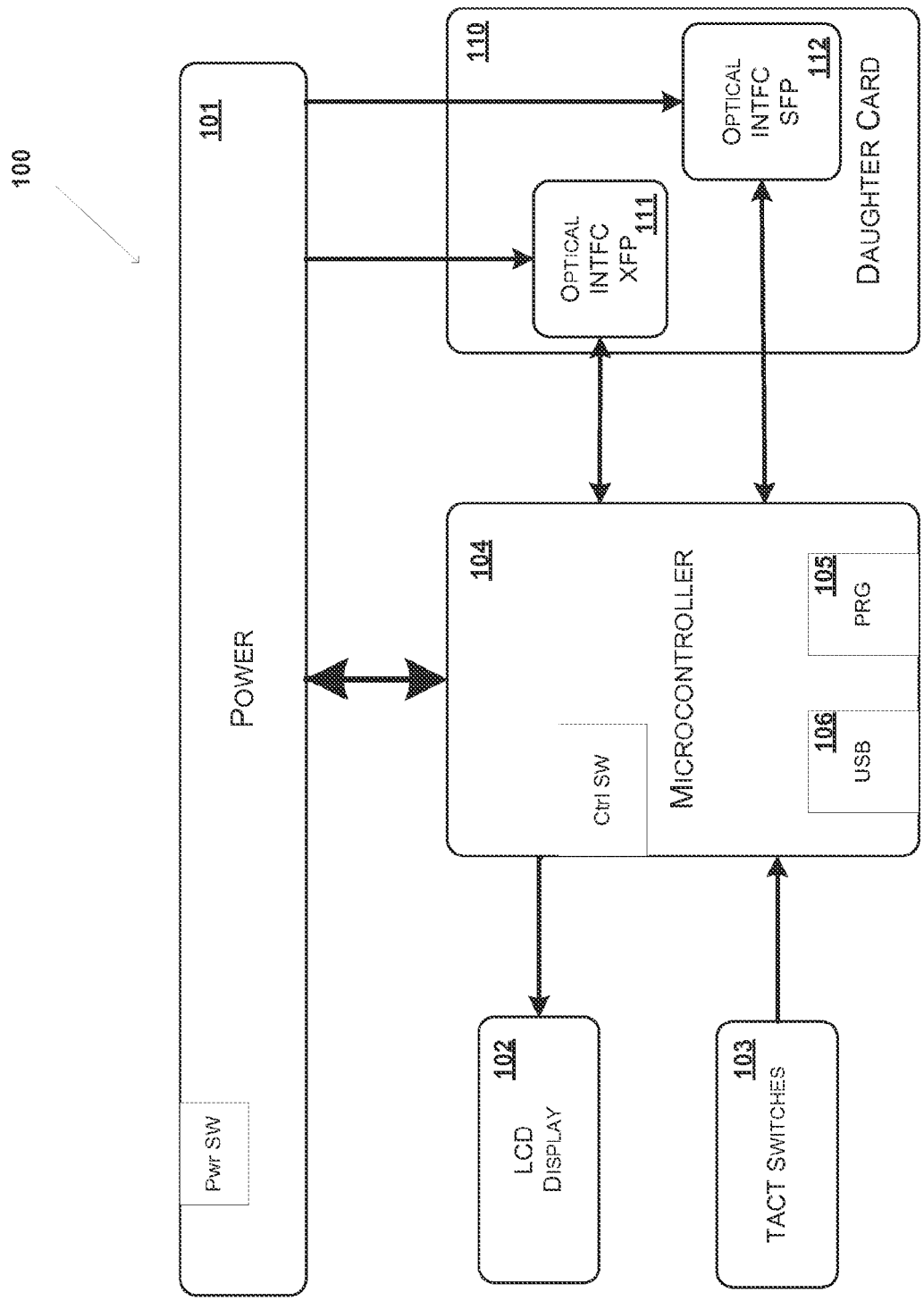
FIG. 2A is a block diagram of the components of an example tuner device (appliance) for tuning transceiver devices.

FIG. 2A shows a block diagram of the primary components of an example tuner device appliance 100 for tuning the DWDM XFP Transceiver device and/or other SFPs. This appliance 100 includes a power supply 101, a controller 104, and LCD display 102, input TACT switches 103, and a daughter card interface 110 that can include an optical XFP interface 111 and/or an optical SFP interface 112.

Figure 2B:
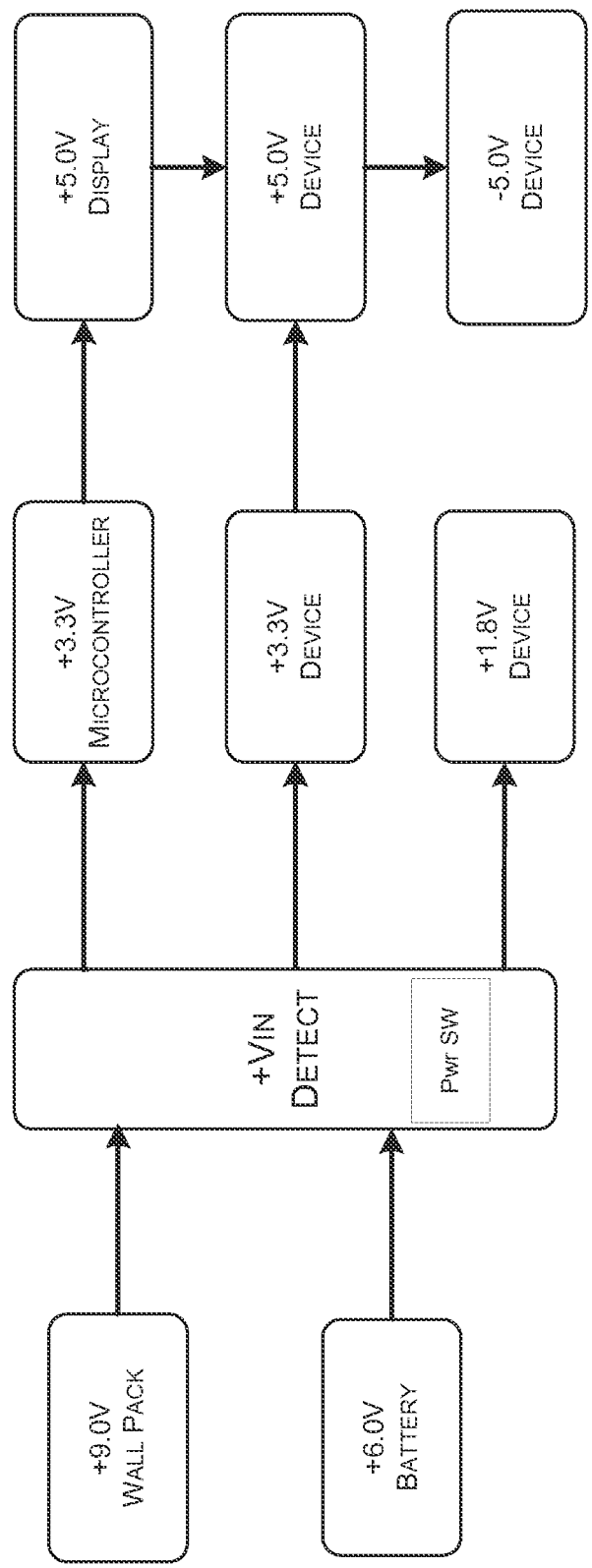
FIG. 2B shows a block diagram of example power components of the example tuner device.

FIG. 2B shows a block diagram of the power components 101 of the example tuner device.

Figure 3A:
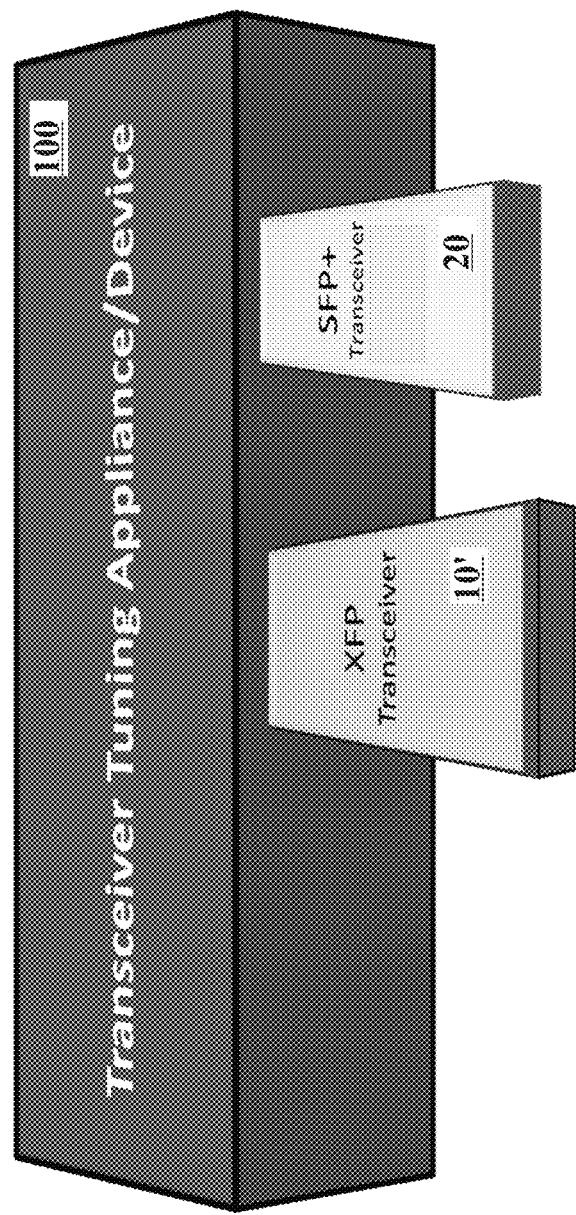
FIG. 3A is a block diagram showing the example tuning device for tuning transceiver devices shown installed in the example tuning device.

FIG. 3A shows an example DWDM XFP Transceiver device 10' and an example SFP tuner device 20 installed in the example transceiver tuning appliance/Device 100 for tuning the DWDM XFP Transceiver device 10' (such as to achieve the tuned device 10 as shown in FIG. 1) and the SFP tuner device 20. The tuning device 100 can be provided by the vendor of the DWDM XFP Transceiver device 10' to the user, and is provided to allow for the tuning (setting wavelength) of the DWDM optical transceiver 10'. This is done independent of the platform (switch, router, or other network equipment) in which the optical transceiver will be deployed in service. A benefit of having the ability to tune and 'set' or "lock" channel comes from the limited number of network devices that support tuning ability, therefore decoupling the tunable transceiver from other more costly devices.

The tuning appliance 100 is meant for use by service provider companies, and to be used by field technicians/engineers in staging and pre-deployment of fiber optic connectivity. There is no needed connection to the 'outside world' via this example device 100.

Figure 3B:
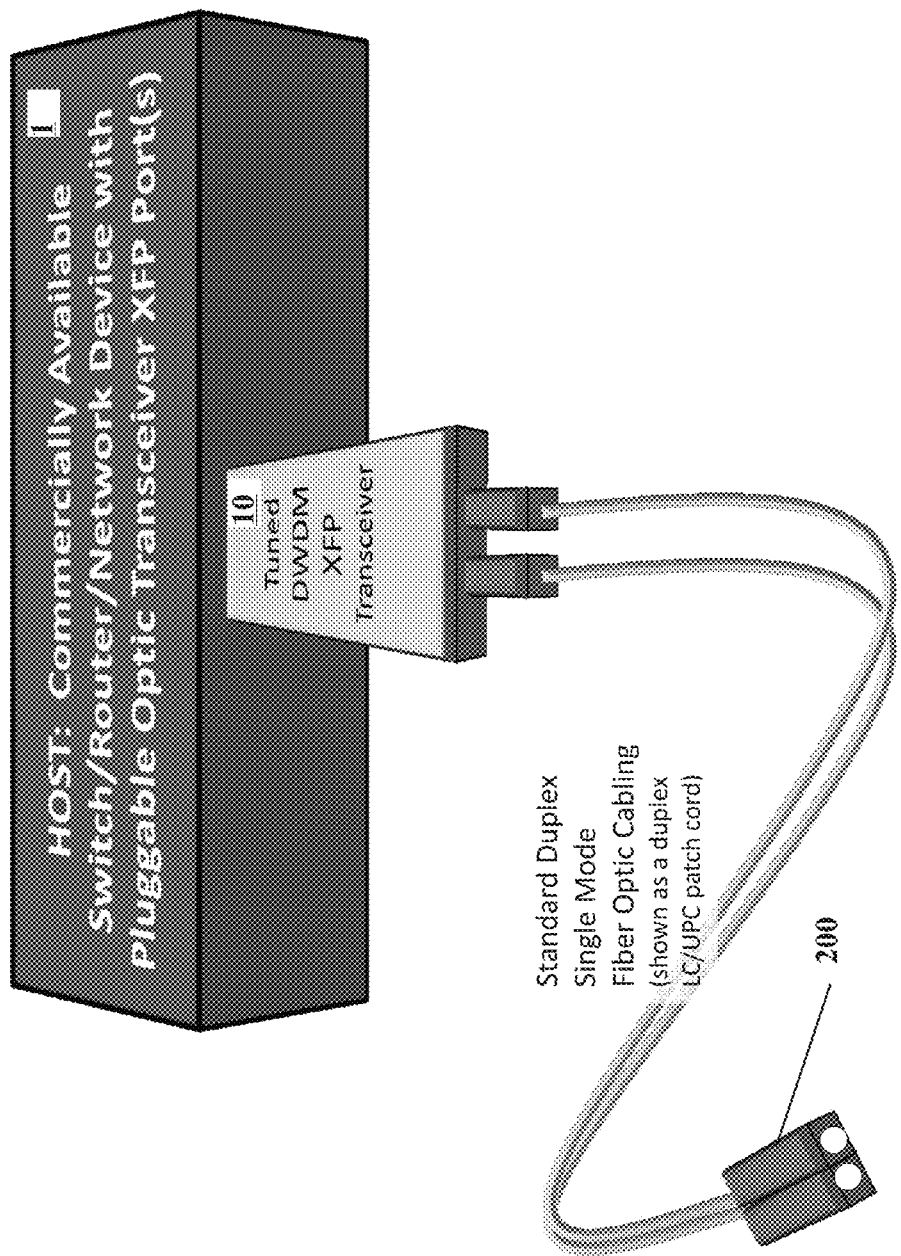
FIG. 3B is a block diagram showing an example 'tuned' DWDM XFP transceiver that was tuned as described herein, deployed by the end-user into a commercially available user device (the "host")

FIG. 3B shows the 'tuned' example DWDM XFP transceiver 10 deployed by the end-user into a commercially available switch, router, or other network host device 1 that has been designed with XFP pluggable fiber optic transceiver port(s). The transceiver's connection to the 'outside world' is the same as any standard optical transceiver—via fiber optic cabling 200 connected to LC connectors on the XFP. Hence, the host device does not need to have any functionality associated with tuning or setting of the DWDM channel: the benefit of the 'tuning appliance' disclosed herein comes from the ability to deploy tuned DWDM transceivers (among others) without the associated tuning software. This flexibility in platform option, coupled with reduced or eliminated lead-time for the transceivers, adds operational benefit and capital cost reduction to fiber deployments.

Figure 4:
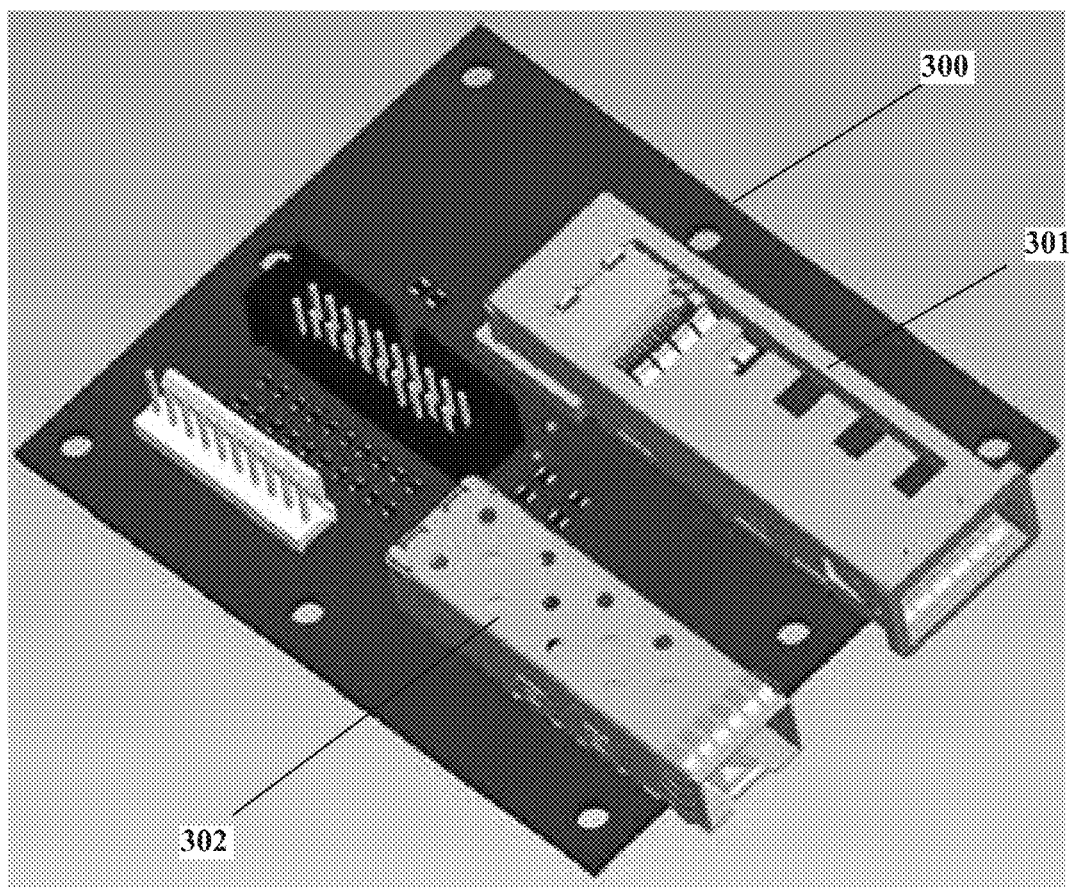
FIG. 4 shows an example embodiment of a printed circuit board (PCB) of an example tuner device.

FIG. 4 is a drawing of an example printed circuit board (PCB) 300 for the appliance that contains the interface cages 301, 302 into which the tunable SFP+ and XFP transceivers would be inserted. This design would also enable the use of a PCB that contains the cages to easily be replaced, should the cages exceed the recommended number of insertions.

An advantage of using the appliance is that the host device does not need to have any functionality associated with tuning or setting of the DWDM channel: the benefit of using the 'tuning appliance' disclosed herein comes from the ability to deploy tuned DWDM transceivers without utilizing the associated tuning software. This flexibility in platform options, coupled with reduced or eliminated lead-time for the transceivers, adds operational benefit and capital cost reduction to fiber deployments.

A number of features in the appliance, the uTune director, are key differentiators from currently available devices, including:

The appliance is a stand-alone device which allows for the tuning (setting) of a DWDM wavelength (channel) on a DWDM XFP (and future SFP+ or SFP) (or CWDM XFP/SFP+ or DWDM/CWDM SFP) optical transceiver;

The appliance does not require any external connectivity to any other devices (PC, laptop, server) during the tuning process, and thus can operate without such connectivity; This also means that it does not rely on any independent operating system (Window, MacOS, Linux, Unix), and thus can operate irrespective of operating systems and avoid requiring licenses for those operating systems.

The appliance does not require any communication connectivity to any other host device(s), and thus can be operated avoiding any such connectivity; Instead, a USB port (or other interface) is available for factory usage (firmware updates, initial setup), and the end user does not need to communicate with any other equipment to perform the tuning process, and such connectivity can be avoided.

Unlike other programmers, the appliance does not need any wired or wireless internet connectivity for licensing and/or programming purposes, and thus can avoid the use of such connectivity;

The appliance maintains a history of license uses (tunes) available via an embedded chipset which utilizes a proprietary algorithm developed to track and decrement tunes as used; Thus, it operates independent of a client-server setup;

The 'tuned' transceiver has no dependencies on the uTune director appliance once tuned; in contrast, other devices operate by requiring the transceiver to remain in the tuning device (sometimes a multi-purpose programmer and/or media converter) in order to 'hold' the channel set ('tune');

The appliance can lock, unlock and relock the TXFP to different channels/wavelengths;

The appliance supports XFP, SFP+, with plans to support other future form factors—may want to use "various" optical transceiver form factors or list XFP, SFP+, plus in the future SFP, X2, QSFP+, CFP;

The appliance supports DWDM and, when available, CWDM tunable optics; and

The appliance provides embedded licensing capability to allow for future licensing/"tunes" of a specific optic in this standalone device Lock Bit Analysis A typical tunable XFP module, as defined by SFF-8477 Rev 1.3 specification, Section 5 (incorporated herein), behaves in the following manner:

When a tunable module is plugged in for the first time it will go to a default channel, or if Tx_DIS is asserted it will go to a standby condition.

When the module is power cycled it will automatically go to the last channel selected, or if Tx_DIS is asserted it will go to a standby condition. If Tx_DIS is asserted, the last channel selected will be cleared, and a valid new channel command will be required to set a channel.

If the Tx is disabled and then re-enabled, the module returns to the last channel selected.

Figure 5:
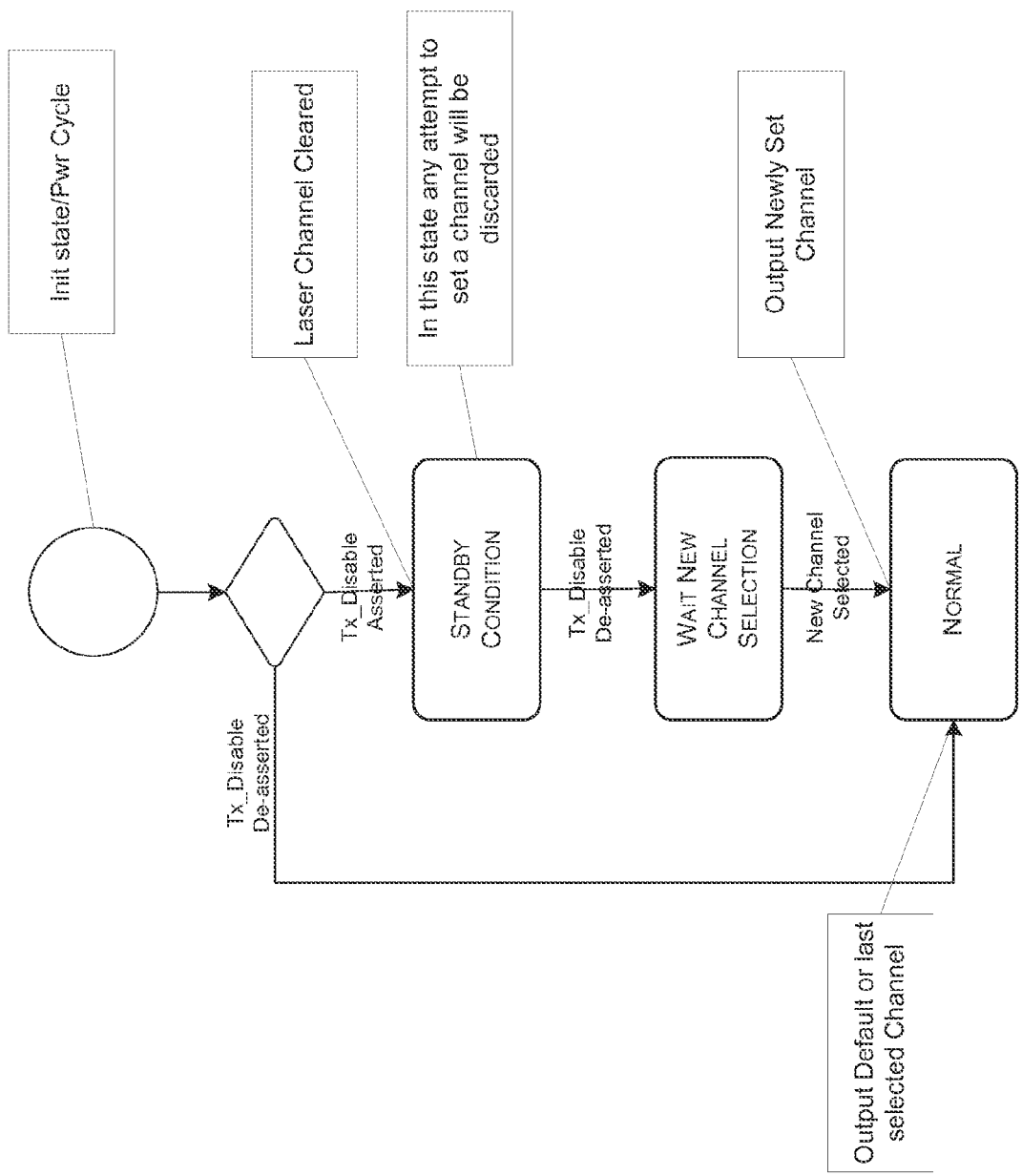
FIG. 5 shows an example tunable XFP Flowchart.

A typical tunable XFP flowchart diagram is shown in FIG. 5.

In contrast, a Lock bit can be used to override the normal behavior of the module. If the lock bit is set, the channel will not return to a default channel on power up, regardless of the state of the Tx_DIS pin.

The lock bit is password protected. A password must be written to the appropriate memory location before the lock bit can be modified.

The non-volatile memory in the module EEPROM saves the last set channel by the external system (switch, router, tuning device). However, in order to ensure that the device is not retuned or set back to default in the removal from the system and/or system commands that would change the wavelength or channel, a specific command register is set via I2C that changes a bit from 0 to 1 which will lock the channel or wavelength designation. The transceiver module is provided "unlocked". The device will tune to the appropriate wavelength or channel and lock the wavelength or channel by using this register.

This bit prevents the channel from reverting to default on power up/power cycling in certain circumstances (TX_DIS line asserted, for example).

Referring to the flow chart of FIG. 5, a tunable XFP module is automatically detected upon insertion in to the uTune Director.

When the user determines the appropriate channel selection, the user will initiate the sequence to commit the channel selection to the tunable XFP module by using the appropriate selection on the user interface. The user also can choose to lock the tunable XFP module after tuning, or maintain the tunable XFP module in an unlocked state.

The uTune Director commits the channel selection to the tunable XFP module by completing the following steps of the flow chart of FIG. 5:

The TX_DISABLE signal line is ASSERTED. The uTune Director applies power to the tunable XFP module. The device is now in a standby state. Depending on the lock-bit status, the uTune Director sends commands and parameters to the tunable XFP module to UNLOCK the tunable XFP module, permitting a new channel to be programmed. The uTune Director changes the TX-DISABLE signal line from ASSERTED to DE-ASSERTED. The tunable XFP module is now awaiting the new channel selection. Via the I2C communications port, a series of commands and parameters are sent to the tunable XFP module to select the new channel.

Once the tunable XFP module receives these commands and parameters, the channel is committed to the tunable XFP module. The channel selection is stored in non-volatile memory contained inside the tunable XFP module. To confirm the tunable XFP module successfully committed the new channel selection, the uTune Director cycles power OFF and ON to the tunable XFP module, re-reads the currently selected channel, and compares the currently selected channel to the requested channel. If the currently selected channel and the requested channel are equal, the uTune Director reports, via the uTune Director Display, the tuning process was successful. If the currently selected channel and the requested channel are not equal, an error is generated by the uTune Director and an error notification is displayed on the uTune Director display. If requested during the channel selection process by the user, the uTune Director locks the tunable XFP module. The tunable XFP module is powered down.

Device Operation:

The use of an example embodiment of the appliance by the operator to tune an optical transceiver (module) is described. The appliance is powered by either an external AC wall adapter, or battery pack. No external connections to computers are required for operation, in an effort to maximize usage and deployment locations.

In order to use, the operator turns on the device by pressing the power button located on the front panel.

All controls and interfaces are located on the front panel of the device housing, allowing for rack or shelf mounting of the device if desired.

Upon powering up, the device will perform Internal diagnostics, such as confirmation of software versions, self-tests, etc., to ensure proper operation. When the system is ready for use, the display will prompt the user to "INSERT MODULE".

A licensing feature has been included to support embodiments using software releases or use as a pay-per-use service if requested. The default is unlimited (UNLM) licenses. The number of licenses available is also displayed when the module insertion prompt appears.

Upon insertion of a module, the device will apply power to the module. The device will confirm this via the LCD display on the front of the device. The contents of the module EEPROM will be read via the I2C bus and the device will report the module's currently set wavelength or channel.

The operator is given the option to select a new channel to set (tune) the module. The operator will press the <S>(select) button on the front of the module and use the up and down (directional arrow) buttons to select the desired wavelength or channel. The buttons, if held down, will scroll more rapidly.

Once the operator has selected the desired wavelength or channel, the operator presses the <T>(tune) button. The operator must confirm this selection by pressing <T>(tune) again. If the operator wishes to cancel the operation, they will press the <M>(menu) button. When the operator has confirmed the tuning operation, the device will display a series of status messages as it performs the operation.

These operations can include, but are not limited to:
1) Application of power to the module to allow for EEPROM reading and writing.
2) Unlocking of the module via the 'lock' bit of the EEPROM. (see FIG. 5)
3) Tuning (setting) of the module wavelength or channel via the I2C communication bus.
4) Verification of the proper setting and storage of the wavelength or channel on the module EEPROM.

Once the appliance has completed these steps, it gives a final message that the module has been tuned and passed the verification. The operator can now remove the module from the device.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. An apparatus for tuning a pluggable transceiver device comprising:
   a power supply;
   a controller;
   a user interface connected to said controller that accepts user inputs;
   a display connected to said controller that displays tuning information to the user; and
   a transceiver interface that receives the transceiver device, wherein
   said controller tunes the optical transceiver device received by said interface according to said user inputs, such that said transceiver uses said tune when removed from said apparatus and inserted into a separate host device for using the optical transceiver device.

2. The apparatus of claim 1, wherein said apparatus does not operate as a host device for using said optical transceiver.

3. The apparatus of claim 1, wherein said apparatus does not communicate with any external device when tuning said optical transceiver.

4. The apparatus of claim 1, wherein said transceiver retains said tune when inserted into the host device by locking the transceiver to prevent the host from retuning the transceiver.

5. The apparatus of claim 1, wherein said transceiver device is a DWDM optical transceiver.

6. The apparatus of claim 1, wherein said transceiver device is a CWDM optical transceiver.

7. A method of tuning a pluggable transceiver device using the apparatus of claim 1, said method comprising the steps of:
   inserting the transceiver device into the apparatus using the transceiver interface;
   accepting user inputs to the user interface for tuning the transceiver device;
   displaying information about the tuning on the display;
   tuning the transceiver device according to the user inputs resulting in a tuned transceiver device;
   removing the tuned transceiver device from the apparatus;
   inserting the tuned transceiver in a host device; and
   operating the host device using the tuned transceiver.

8. An apparatus for tuning a pluggable transceiver device comprising:
   a power supply;
   a controller;
   a user interface connected to said controller that accepts user inputs;
   a display connected to said controller that displays tuning information to the user; and
   a transceiver interface that receives the transceiver device, wherein
   said controller tunes the optical transceiver device received by said interface according to said user inputs, such that said transceiver uses said tune when removed from said apparatus and inserted into a separate host device for using the optical transceiver device and such that said transceiver retains said tune when inserted into the host device by locking the transceiver to prevent the host from retuning the transceiver.

9. The apparatus of claim 8, wherein said apparatus does not operate as a host device for using said optical transceiver.

10. The apparatus of claim 8, wherein said apparatus does not communicate with any external device when tuning said optical transceiver.

11. The apparatus of claim 8, wherein said transceiver device is a DWDM optical transceiver.

12. The apparatus of claim 8, wherein said transceiver device is a CWDM optical transceiver.

13. An apparatus for tuning a pluggable transceiver device comprising:
   a power supply;
   a controller;
   a user interface connected to said controller that accepts user inputs;
   a display connected to said controller that displays tuning information to the user; and
   a transceiver interface that receives the transceiver device, wherein said controller tunes the optical transceiver device received by said interface according to said user inputs, such that said transceiver uses said tune when removed from said apparatus and inserted into a separate host device for using the optical transceiver device and such that said transceiver retains said tune when inserted into the host device by locking the transceiver to prevent the host from retuning the transceiver, and wherein
   said apparatus does not operate as a host device for using said optical transceiver, and further wherein
   said apparatus does not communicate with any external device when tuning said optical transceiver.

14. The apparatus of claim 13, wherein said transceiver device is a DWDM optical transceiver or a CWDM optical transceiver.

15. A method for tuning a pluggable transceiver device using a tuning apparatus, said method comprising the steps of:
   inserting the transceiver device into the tuning apparatus;
   accepting user inputs to the tuning apparatus for tuning the transceiver device;
   tuning the transceiver device according to the user inputs resulting in a tuned transceiver device;
   removing the tuned transceiver device from the apparatus;
   inserting the tuned transceiver into a host device; and
   operating the host device using the tuned transceiver.

16. The method of claim 15, wherein the tuning apparatus does not communicate with any external device when tuning the optical transceiver.

17. The apparatus of claim 15, wherein the tuning apparatus does not operate as a host device for using the optical transceiver.

18. The apparatus of claim 15, wherein the transceiver retains said tune when inserted into the host device by including the additional step of locking the transceiver to prevent the host from retuning the transceiver.

19. The apparatus of claim 15, wherein the transceiver device is a DWDM optical transceiver or a CWDM optical transceiver.

20. A method for tuning a pluggable transceiver device using a tuning apparatus, said method comprising the steps of:
   inserting the transceiver device into the tuning apparatus;
   accepting user inputs to the tuning apparatus for tuning the transceiver device;
   tuning the transceiver device according to the user inputs resulting in a tuned transceiver device without the tuning apparatus communicating with any external devices;
   locking the transceiver to prevent a device using the tuned transceiver from retuning the transceiver;
   removing the tuned transceiver device from the apparatus.

21. The method of claim 20, further comprising the steps of:
   inserting the tuned transceiver into a host device; and
   operating the host device using the tuned transceiver.

* * * * *